No. 613,728. M. SHIVELY. Patented Nov. 8, 1898.
METHOD OF AND APPARATUS FOR PURIFYING CRUDE OILS.
(Application filed Apr. 7, 1897.)
(No Model.)
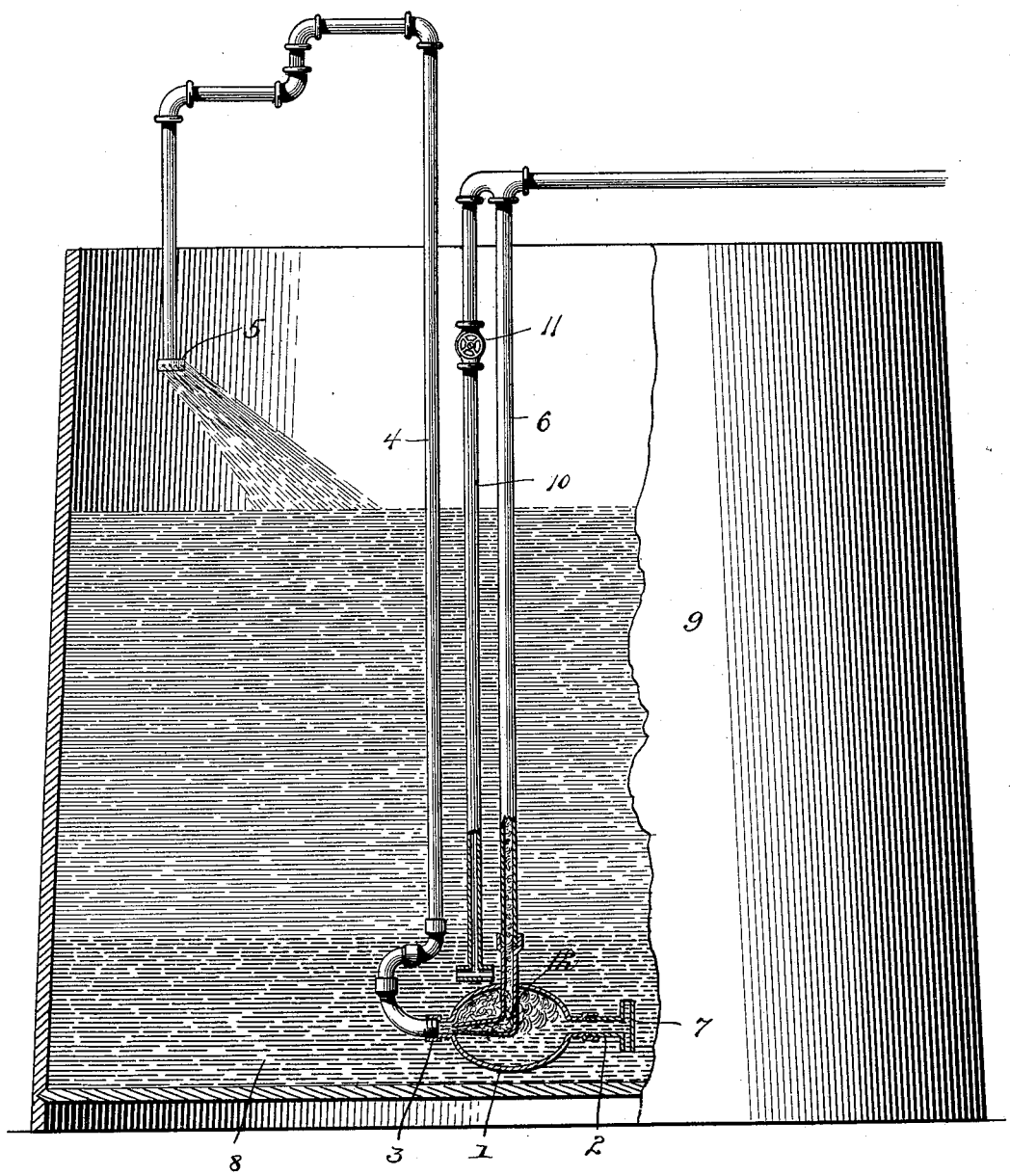
Witnesses
E. N. Monroe
V. B. Hillyard.
Inventor
Martin Shively
By his Attorneys,
C. A. Snow & Co.

UNITED STATES PATENT OFFICE.

MARTIN SHIVELY, OF RISING SUN, OHIO.

METHOD OF AND APPARATUS FOR PURIFYING CRUDE OILS.

SPECIFICATION forming part of Letters Patent No. 613,728, dated November 8, 1898.

Application filed April 7, 1897. Serial No. 631,147. (No model.)

*To all whom it may concern:*

Be it known that I, MARTIN SHIVELY, a citizen of the United States, residing at Rising Sun, in the county of Wood and State of Ohio, have invented a new and useful Method of and Apparatus for Purifying Crude Oils, of which the following is a specification.

In the process of purifying crude petroleum as it comes from the well and other oils for illuminating, heating, and industrial purposes difficulty has been encountered in removing the scum and sedimentary products in cold weather, the dregs or products precipitated being removed by a pumping apparatus; but no practical means have suggested themselves for getting rid of the scum, thereby causing expense and delay in placing the purified oil in condition for the market.

In accordance with the present method the oil to be purified is placed in a tank or other receptacle and gradually heated, agitated, and subjected to the action of hot water, whereby the scum is dissipated without materially increasing the sedimentary products, the water serving to heat the oil, to set it in motion, and to remove the impurities by passing therethrough.

The apparatus in its general construction as devised for carrying out the intent of the invention consists of a drum of oval shape having induction and eduction ports at its ends, a steam-pipe communicating with a side of the drum, a discharge-pipe in communication with the eduction-port of the drum and terminating in a spray or jet nozzle, and a supplementary heater to be used in extremely cold weather for bringing the water to and maintaining it at a proper temperature.

For a full understanding of the merits and advantages of the invention reference is to be had to the accompanying drawing and the following description.

The improvement is susceptible of various changes in the form, proportion, and the minor details of construction without departing from the principle or sacrificing any of the advantages thereof; and with a view to a full disclosure of the invention an adaptation thereof is shown in the accompanying drawing, which is an elevation of the apparatus, partly in section, showing it in working relation.

In practicing the invention a layer of water, either fresh or salt, is placed in a tank or receptacle, and the oil to be purified is filled into the tank or receptacle upon the layer of water to the requisite depth. A drum or hollow body is immersed in the layer of water and is connected with a steam-generator and is provided with ingress and egress openings, a discharge-pipe being connected with the egress-opening and terminating in a nozzle having a series of jets. The steam being turned on causes the water to circulate through the drum or hollow body and at the same time heats the water in its circulation, and the water escaping through the nozzle causes the oil to be purified to circulate in the tank or receptacle, the spent water passing through the body of the oil to the layer of water at the bottom of the tank, with which it commingles to be again circulated, thereby heating, agitating, and purifying the oil. This operation is continued until the oil is heated from 10° to 20° and for a period ranging from two to three hours, after which the oil is permitted to settle and is ready for the market.

The specific means devised for carrying the invention into effect consists of a drum or hollow body 1 of oval form, having an inlet 2 and an outlet 3 at its opposite ends, a discharge-pipe 4, communicating with the outlet 3 and terminating in a nozzle 5, having a series of openings in its side to throw a series of jets in one direction, and a steam-pipe 6, communicating with a side of the drum or body 1 and leading from a suitable source of steam supply or generator. A T-coupling 7 connects with the inlet 2, so as to draw in the water from opposite points. The drum or hollow body 1 is immersed in a layer of fresh or salt water 8 at the bottom of a tank or receptacle 9, and the nozzle 5 is arranged so as to discharge the water in jets above the body of oil in the tank or receptacle 9 and tangentially thereto, so as to cause the body of oil to eddy or move in a circular direction. A supplemental pipe 10 extends through the body of the oil and communicates at its upper end with the pipe 6 and is provided with a valve 11 for controlling the admission of steam thereto. This pipe 10 terminates at its lower end in a T or other form of nozzle 12 for discharging the steam laterally into the body of the water 8, whereby the latter is heated independently of the steam admitted through the pipe 6, which is of advantage in extremely cold weather to bring the oil to the desired temperature. The several pipes 4, 6, and 10 are grouped together and located centrally of the tank or receptacle 9, so as to offer a minimum amount of resistance to the body of the oil when set in motion by the jets escaping from the nozzle 5. The oil as it comes from the well contains impurities of an oily character which are heavier than the oil of commerce and yet lighter than water. These impurities when separated settle to the bottom of the bulk of oil and float upon the surface of the water supporting the oil. The water in its descent through the oil carries the impurities with it and by reason of its greater specific gravity leaves the impurities upon its surface. The water, being taken from the body at a point below the level, is free from impurities, as the latter are separated at the surface. The heating of the oil lightens and facilitates the separation of the impurities therefrom, and the passing of the water downward therethrough hastens the purifying process by forming innumerable passages for the heavier substances. The rotation of the oil mixes the hot water therewith and enables the heating to be effected in a comparatively short time and the process to be quickly accomplished.

Having thus described the invention, what is claimed as new is—

1. The herein-described method of purifying crude petroleum and other oils in bulk, consisting of delivering jets of hot water tangentially upon the surface of the oil contained in a tank or receptacle to cause the oil to rotate, then allowing the hot water to pass down through the rotating body of oil to simultaneously heat it and absorb and precipitate the impurities partly separated by the rotary movement of the oil, substantially as described.

2. The herein-described method of purifying crude petroleum and other oils in bulk, consisting of floating the oil upon a body of hot water, then delivering jets of hot water tangentially upon the surface of the oil to set it in rotation, then allowing the hot water to pass down through the rotating body of oil to simultaneously heat it and absorb and precipitate the impurities partly separated by the rotary movement of the oil, substantially as described.

3. An apparatus for purifying petroleum and other oils, consisting of a drum or hollow body having inlet and outlet openings at its ends, a steam-pipe communicating with a side of the body or drum, and a discharge-pipe in communication with the aforesaid outlet and terminating in a nozzle for delivering jets upon the oil, substantially as set forth.

4. In an oil-purifier, the combination of a drum or hollow body having inlet and outlet openings, a steam-pipe communicating with a side of the drum or hollow body, a discharge-pipe connected with the outlet, and a supplemental pipe in communication with the steam-pipe and terminating in a nozzle adjacent to the drum or hollow body, and having a controlling-valve near its upper end, substantially as and for the purpose set forth.

5. In combination, a tank or receptacle for receiving a layer of water in its lower portion and a body of oil to be purified, a drum or hollow body of approximately oval form immersed in the layer of water and having inlet and outlet openings at its opposite ends, a discharge-pipe communicating with the outlet and terminating in a nozzle at the upper end and near a side of the tank for delivering a series of jets in the same direction upon the surface of the oil about at a tangent thereto, a steam-pipe communicating with a side of the drum or body, and a supplemental steam-pipe having a nozzle at its lower end adjacent to the drum and having communication at its upper end with the aforesaid steam-pipe, and provided with a controlling-valve, the several pipes being disposed centrally of the tank, substantially as set forth for the purpose described.

In testimony that I claim the foregoing as my own I have hereto affixed my signature in the presence of two witnesses.

MARTIN SHIVELY.

Witnesses:
W. L. BALL,
W. O. CLAY.